United States Patent [19]

Grzywa

[11] Patent Number: 4,754,883
[45] Date of Patent: Jul. 5, 1988

[54] AUTOMOBILE TRUNK ORGANIZER

[76] Inventor: Jeffrey W. Grzywa, 1723 Forest Cove Dr., Apt. 105, Mt. Prospect, Ill. 60056

[21] Appl. No.: 14,364

[22] Filed: Feb. 13, 1987

[51] Int. Cl.⁴ .............................................. A47G 29/00
[52] U.S. Cl. ........................................ 211/71; 211/74
[58] Field of Search .......................... 211/71, 74, 126; 248/146, 205.2; 220/17; 224/42.42 A

[56] References Cited

U.S. PATENT DOCUMENTS

| | | |
|---|---|---|
| D. 221,035 | 6/1971 | Raines . |
| D. 223,681 | 5/1972 | Whitaker . |
| 1,677,276 | 7/1928 | Deicken . |
| 1,757,475 | 5/1930 | Pratt . |
| 2,597,460 | 5/1952 | Eberhardt . |
| 2,614,407 | 10/1952 | Mercer ................................ 211/74 |
| 2,695,712 | 11/1954 | Kolander . |
| 2,897,999 | 8/1959 | Bishop . |
| 2,910,073 | 10/1959 | Lookholder .................... 248/146 X |
| 2,982,392 | 5/1961 | Bossone . |
| 3,295,737 | 1/1967 | Page et al. . |
| 3,307,740 | 3/1967 | Fant ............................. 248/205.2 X |
| 3,873,010 | 3/1975 | Patterson . |
| 3,976,193 | 8/1976 | Dogliotti . |
| 4,068,760 | 1/1978 | Johnson, Jr. ........................... 211/74 |

Primary Examiner—Reinaldo P. Machado
Assistant Examiner—Sarah A. Lechok Eley
Attorney, Agent, or Firm—Wood, Dalton, Phillips, Mason & Rowe

[57] ABSTRACT

An organizer for the trunk of an automobile in the form of a tray. The tray includes a top surface integral with a substantially continuous side wall. The side wall is substantially coextensive with the top surface of the tray about the perimeter thereof. The side wall has a bottom edge adapted to rest upon a supporting surface. The side wall is dimensioned such that the top surface of the tray is disposed in spaced parallel relation to the supporting surface. The top surface of the tray has a plurality of openings each leading to a compartment. The compartments are each adapted to receive an article for maintaining an automobile. The tray is formed such that the compartments are disposed inwardly of the substantially continuous side wall substantially entirely beneath the top surface. In addition, the tray can be selectively maintained in a desired position on the supporting surface.

10 Claims, 1 Drawing Sheet

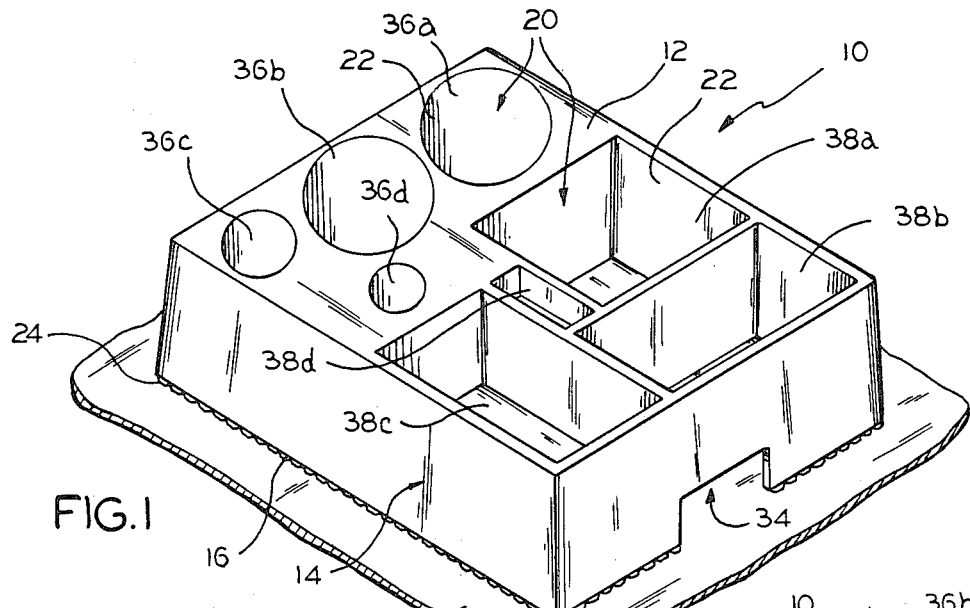
FIG.1
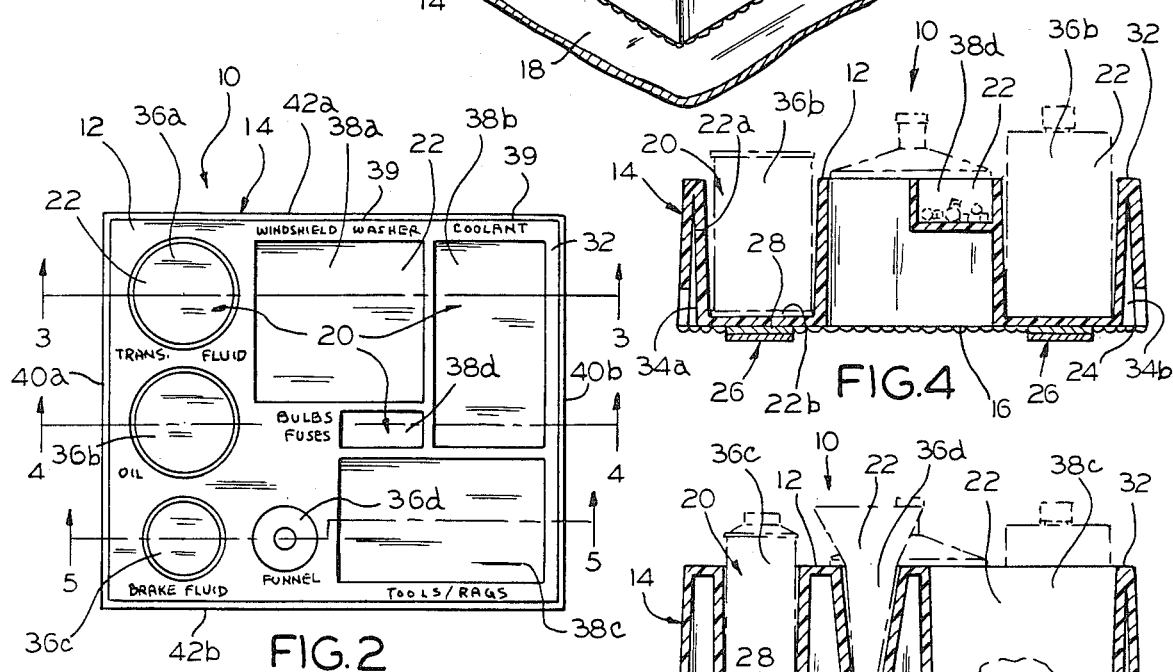
FIG.2
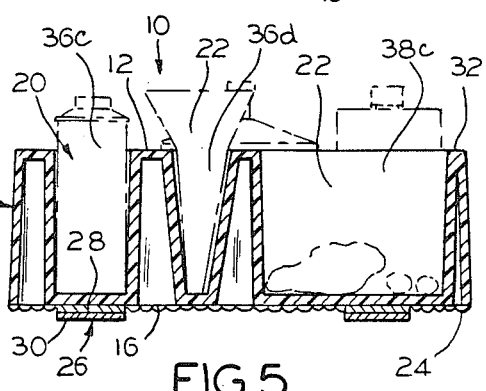
FIG.4
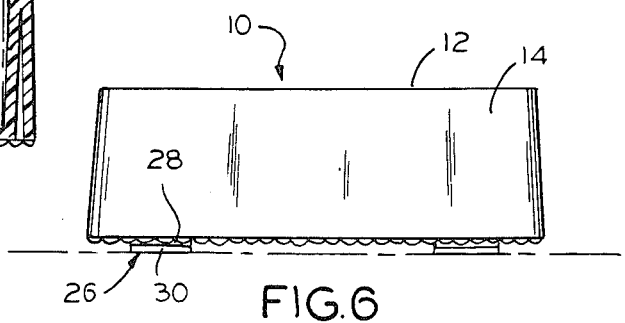
FIG.5
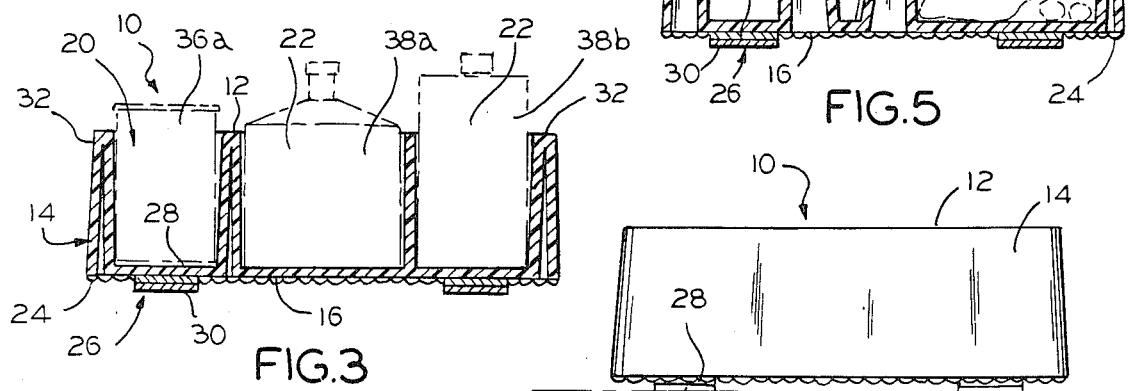
FIG.3
FIG.6

AUTOMOBILE TRUNK ORGANIZER

FIELD OF THE INVENTION

The present invention relates to automobile accessory devices and, more particularly, to an automobile trunk organizer.

BACKGROUND OF THE INVENTION

For nearly everyone owning an automobile, it is a common practice to carry a number of articles for maintaining it in good operating condition. This may include, for example, oil, transmission fluid, brake fluid and the like as well as windshield washer solvent, coolant, tools and rags. In addition, it is generally recognized as good practice to carry bulbs, fuses and even a funnel.

Unfortunately, there has been no highly effective automobile trunk organizer available to the automobile owner. Instead, such maintenance items as oil and windshield washer solvent are often simply placed loosely in the trunk where they can roll about making considerable noise and can even spill causing undesirable staining of trunk carpeting and/or other items carried in the trunk. Of course, the same holds true for transmission fluid, brake fluid and coolant.

Moreover, with regard to bulbs and fuses, they are oftentimes kept in the glove compartment of the automobile. In such location, however, they are difficult to locate due to their small size and can be damaged by other articles normally kept in the glove compartment due to the fact that they are fragile in nature. As a result, a bulb or fuse may not be available when most needed.

With regard to tools and rags, they, too, are oftentimes maintained loosely in the trunk. Soiled rags can, thus, soil trunk carpeting as well as other items carried in the trunk and may be difficult to locate when needed. Similarly, tools can be difficult to locate within a trunk and can move about causing undesirable noise.

Further, it is generally recognized that it would be desirable to carry a funnel for many purposes. These purposes include adding oil, transmission fluid and brake fluid without spillage as well as adding gasoline in the event the automobile owner should run out of gasoline and only be able to obtain it in a container not well-suited for pouring into the usually recessed gasoline filler tube after removal of the cap therefrom. Unfortunately, a funnel is particularly likely to result in undesirable stains in the trunk.

As a result, it has remained to overcome the above stated problems and accomplish the stated objects by providing an entirely satisfactory automobile trunk organizer.

SUMMARY OF THE INVENTION

Accordingly, the present invention is directed to an organizer for the trunk of an automobile in the form of a tray. The tray includes a top surface integral with a substantially continuous side wall. The side wall is substantially coextensive with the top surface of the tray about the perimeter thereof and has a bottom edge adapted to rest upon a supporting surface. A plurality of openings are provided in the top surface of the tray each of which leads to a compartment for receiving an article for maintaining an automobile where the compartment is disposed substantially entirely beneath the top surface of the tray inwardly of the substantially continuous side wall. The side wall is thus dimensioned such that the top surface of the tray is disposed in spaced parallel relation to the supporting surface. The tray also includes means for selectively maintaining it in a desired position on the supporting surface. With this construction, the automobile trunk organizer is well adapted for its intended purposes.

In an exemplary embodiment, the top surface of the tray is generally rectangular and the side wall of the tray is integral with an outer edge of the top surface. Preferably, the side wall of the tray tapers outwardly from the outer edge to the supporting surface. Moreover, the bottom edge of the side wall is substantially continuous and the outer edge of the top surface is disposed inwardly of the bottom edge of the side wall.

Still further, handle means are provided for lifting the tray from the supporting surface. In the preferred embodiment, the handle means is defined by a pair of cut-outs in the side wall. In this connection, the cut-outs are on opposite sides of the tray and comprise centered interruptions in the bottom edge thereof.

In the exemplary embodiment, the position maintaining means can include a plurality of gripping nipples associated with the bottom edge of the side wall for nonslip cooperation with the supporting surface. Alternatively, releasable fastening means can be provided comprising a first fastener portion integral with the tray and a second fastener portion integral with the supporting surface. Moreover, the position maintaining means can include both the gripping nipples and the releasable fastening means if desired.

Still further details of the preferred embodiment include the compartments each being formed by a compartment wall defining one of the openings in the top surface of the tray. The compartment walls each extend downwardly from the top surface of the tray to a bottom compartment surface. Preferably, the compartments include a plurality of cylindrical compartments and a plurality of rectangular compartments for receiving articles of different shapes therein.

Advantageously, the cylindrical compartments are disposed on one side of the tray and the rectangular compartments are disposed on the other side of the tray. With this arrangement, the cylindrical compartments can be sized and shaped to hold oil, transmission fluid and brake fluid containers and a funnel whereas the rectangular compartments can be sized and shaped to hold coolant, windshield solvent and tools and rags. Preferably, the bottom surfaces of each of the compartments are positioned in alignment with the bottom edge of the side walls so as rest upon the supporting surface.

Still other objects, advantages and features of the present invention will become apparent from a consideration of the following specification taken in conjunction with the accompanying drawings.

BRIEF DESCRIPTION OF THE DRAWINGS

FIG. 1 is a perspective view of an automobile trunk organizer in accordance with the present invention;

FIG. 2 is a top plan view of the automobile trunk organizer of FIG. 1;

FIG. 3 is a cross-sectional view taken on the line 3—3 of FIG. 2;

FIG. 4 is a cross-sectional view taken on the line 4—4 of FIG. 2;

FIG. 5 is a cross-sectional view taken on the line 5—5 of FIG. 2; and

FIG. 6 is a side elevational view of the automobile trunk organizer of FIG. 1.

DETAILED DESCRIPTION OF THE PREFERRED EMBODIMENT

An exemplary embodiment of an automobile trunk organizer in accordance with the invention is illustrated in FIG. 1. The automobile trunk organizer comprises a tray 10 including a top surface 12 integral with a substantially continuous side wall 14. The side wall 14 is substantially coextensive with the top surface 12 of the tray 10 about the perimeter thereof and has a bottom edge 16 adapted to rest upon a supporting surface 18. A plurality of openings generally designated 20 are provided in the top surface 12 of the tray 10 with each of the openings 20 leading to a compartment generally designated 22 for receiving an article for maintaining an automobile where the compartment 22 is disposed substantially entirely beneath the top surface 12 of the tray 10. The side wall 14 is thus dimensioned such that the top surface 12 of the tray 10 is disposed in spaced parallel relation to the supporting surface 18. The automobile trunk organizer comprising the tray 10 also includes means for selectively maintaining the tray in a desired position on the supporting surface 18. More specifically, the position maintaining means advantageously includes a plurality of gripping nipples 24 and/or releasable fastening means 26, as will be described hereinafter.

In particular, the gripping nipples 24 associated with the bottom edge 16 of the side wall 14 provide non-slip cooperation with the supporting surface 18. Thus, where the supporting surface 18 is covered with carpeting such as in the trunk of an automobile, the floor or bed of a truck, or any other similar compartment in a vehicle, the nipples cooperate with the pile of the carpeting or other supporting surface such that the tray 10 will not move about on the surface or carpeting. For enhancing the performance, the gripping nipples 24 may be formed of a rubber-like material having high frictional resistance to movement on the supporting surface 18.

Where desired, the position maintaining means can include releasable fastening means 26 also cooperatively related to the supporting surface 18. More specifically, the releasable fastening means 26 suitably includes a first fastener portion 28 integral with the tray 10 and a second fastener portion 30 integral with the supporting surface 18 (see, also, FIG. 6). Specifically, the releasable fastening means 26 can comprise a Velcro brand fastener in which case the fastener portions 28 and 30 comprise hook and loop fabric components.

As will be appreciated by referring to FIGS. 1-3, the top surface 12 of the tray 10 is generally rectangular and the side wall 14 of the tray 10 is integral with an outer edge 32 of the top surface 12. It will also be appreciated that the side wall 14 of the tray 10 tapers outwardly from the outer edge 32 to the supporting surface 18. Still further, the bottom edge 16 of the side wall 14 is substantially continuous with the outer edge 32 of the top surface 12 being disposed inwardly of the bottom edge 16 (see FIG. 2).

In the preferred embodiment, handle means 34 are provided for lifting the tray 10 from the supporting surface 18 (see FIGS. 1 and 4). The handle means 34 are defined by a pair of cut-outs 34a and 34b in the side wall 14. As shown, the cut-outs 34a and 34b in the side wall 14 are centered interruptions in the bottom edge 16 on opposite sides of the tray 10.

Referring specifically to FIGS. 3-5, the compartments 22 each are formed by a compartment wall 22a defining one of the openings 20 in the top surface 12 of the tray 10 and extending downwardly from the top surface 12 of the tray 10 to a bottom surface 22b. The compartments 22 more specifically include a plurality of cylindrical compartments 36a-d and a plurality of rectangular compartments 38a-d for receiving articles of different shapes for maintaining an automobile. As shown in FIGS. 1 and 2, the cylindrical compartments 36a-d are disposed on one side of the tray 12 and the rectangular compartments 38a-d are disposed on the other side of the tray 12.

In the particular embodiment illustrated in the drawings, the cylindrical compartments 36a-d are sized and shaped to hold oil, transmission fluid and brake fluid containers and a funnel and the rectangular compartments 38a-d are sized and shaped to hold coolant, windshield solvent, tools and rags and bulbs and fuses. The bottom walls of each of the compartments 36a-d and 38a-c are positioned in alignment with the bottom edge 16 of the side wall 14 so as to rest upon the supporting surface 18 such that the automobile maintaining articles (such as oil, transmission fluid and brake fluid containers, funnel, coolant, windshield solvent and tools and rags) are substantially entirely contained therewithin (see FIGS. 3-5 with the respective articles illustrated in phantom lines). Preferably, the remaining rectangular compartment 38d is sized and shaped to hold bulbs and fuses centrally of the tray 12 with the bottom surface 22b spaced intermediate the supporting surface 18 and the top surface 12 of the tray 10.

With regard to the rectangular compartment 38a for windshield solvent, it will be noted that it is preferably square in shape. It has been found that, by forming the rectangular compartment 38a with a six-inch square opening, the compartment 38a is entirely capable of holding both square and round one-gallon bottles of windshield washer solution therewithin and, similarly, the rectangular compartment 38b is preferably approximately 7½ inches by 4¼ inches to hold a conventional coolant bottle or extra water stored in a conventional coolant bottle. Moreover, due to the sizing and arrangement of the other compartments, the rectangular compartment 38c can be approximately 7¼ inches by 4¾ inches, giving excellent capacity for holding tools and rags therewithin.

As will also be appreciated, the rectangular compartment 38d can be disposed centrally of the tray 10 nested between the rectangular compartments 38a-c. It can then occupy an area of approximately 3 inches by 1½ inches which is entirely suitable for storing a good supply of bulbs and fuses as would be needed under any ordinary circumstances with any particular automobile. For purposes of ease of access, the bottom surface 22b of the rectangular compartment 38d is shallower than the remaining bottom surfaces 22b of all of the other compartments 22.

With regard to the cylindrical compartments 36a-d, they are preferably sized and arranged as shown in FIGS. 1 and 2. More specifically, the cylindrical compartments 36a-b are preferably approximately 4¼ inches in diameter which is a standard size for oil and transmission fluid containers, the cylindrical compartment 36c is preferably 2¾ inches in diameter which is a conventional size for a brake fluid container, and the cylindrical compartment 36d is preferably two inches in diameter to receive the nozzle of a conventional funnel. With this arrangement of compartments 22, the overall dimension of the tray 10 is approximately 16 inches by 13¼ inches resulting in a very compact automobile trunk organizer.

More specifically, the compactness of the automobile trunk organizer is achieved largely through the unique nesting arrangement of the compartments 22. It will also be appreciated that the overall height of the tray 10 is preferably on the order of approximately 5 inches which results in articles contained within the compartments 22 being substantially entirely contained therewithin or at least contained to a degree in which they are stabilized therewithin whereby they will not fall out of the tray 10 resulting in spillage of the contents thereof in the trunk which might otherwise cause staining of the carpeting in the trunk and/or other articles contained therein. With this height, the cut-outs 34a and 34b can be on the order of 4 inches wide by 1½ inches high, giving a good gripping area for lifting the tray 10 from the trunk.

With the dimensions given, it will be appreciated that the top surface 12 of the tray 10 can also include indicia 39 such as shown in FIG. 2. This indicia guides the automobile owner in placing a standard one-quart bottle or can of automatic transmission fluid in a cylindrical compartment 36a, a standard one-quart bottle or can of engine oil in the cylindrical compartment 36b, a standard one pint can of brake fluid in the cylindrical compartment 36c, a standard one-gallon round or square bottle of windshield washer solution in the rectangular compartment 38a, a standard one-gallon bottle of engine coolant or extra water stored in a coolant bottle in the rectangular compartment 38b, tools and rags in the rectangular compartment 38c, bulbs and fuses in the rectangular compartment 38d, and a funnel in the cylindrical compartment 36d. Because of the standard sizing and unique arrangement, the tray 10 is well suited for its intended purpose.

Still further features of the present invention include the compartment walls 22a of the compartments 22 each tapering inwardly toward the corresponding one of the bottom surfaces 22b. This is clearly shown in FIGS. 3–5 and accommodates possible slight differences in the sizes of standard containers as well as permitting some frictional gripping of such containers by means of the resulting interference fit therebetween. Moreover, as previously discussed, the cut-outs 34a and 34b comprising the handle means 34 are on opposite sides of the tray 10, i.e., in the parallel side wall portions 40a and 40b which are perpendicular to the parallel side wall portions 42a and 42b.

As previously suggested, the cylindrical compartment 36d is large enough to hold any conventional funnel or multiple funnels where one is placed inside the other. Also, as previously suggested, the tray 10 is designed to take up a minimal amount of space within the trunk of an automobile, i.e., essentially no more space than the contents themselves.

As will be appreciated by those skilled in the art, the tray 10 can be molded from any of a number of conventional plastic materials. It will then be formed such that the edges will be rounded at least at the cut-outs 34a and 34b comprising the handle means 34, but preferably along all edges as a safety factor to prevent the automobile owner from inadvertently receiving a cut upon handling the tray 10. Further, if the tray 10 is molded from plastic, the printed indicia 39 can be integrally molded on the top surface 12 or on the bottom surfaces 22b of the compartments 22.

As previously mentioned, the compartments 22 can all be tapered to account for nominal differences in the size of containers while gripping the contents thereof. It is anticipated however, that regardless of the other compartments, the cylindrical compartment 36d will be tapered to hold a funnel in a stable manner. Moreover, the specific arrangement of the compartments 22 is important not only for minimizing utilization of space but also for positioning the center of gravity to stabilize the tray 10.

While in the foregoing there has been set forth a preferred embodiment of the invention, the invention has much broader applicability than as an automobile trunk organizer. In a broader sense, the invention is useful for organizing items normally required for standard maintenance of any vehicle no matter where the items are to be stored in the vehicle, and it is also potentially useful in even entirely different environments for diverse purposes. Accordingly, it is to be understood that the invention defined by the appended claims is to be broadly construed to include all such uses to the full extent allowed by the art.

I claim:

1. An automobile trunk organizer, comprising:

a tray including a top surface integral with a substantially continuous side wall, said side wall being substantially coextensive with said top surface of said tray about the perimeter thereof, said side wall having a bottom edge adapted to rest upon a supporting surface;

said side wall being dimensioned such that said top surface of said tray is disposed in spaced parallel relation to said supporting surface, said side wall of said tray being integral with an outer edge thereof;

a plurality of openings in said top surface of said tray, each of said openings leading to a compartment for receiving an article for maintaining an automobile where said compartment is disposed substantially entirely beneath said top surface of said tray, said compartments being disposed inwardly of said substantially continuous side wall;

said compartments each being formed by a compartment wall defining one of said openings in said top surface of said tray and extending downwardly from said top surface of said tray to a bottom surface, said bottom surfaces of each of said compartments being positioned in alignment with said bottom edge of said side walls so as to rest upon said supporting surface such that said automobile maintaining articles are substantially entirely contained therewithin, said compartments being disposed about the perimeter of said top surface of said tray in a manner minimizing utilization of space while positioning the center of gravity to stabilize said tray; and means for selectively maintaining said tray in a desired position on said supporting surface, said position maintaining means comprising at least one of a plurality of gripping nipples associated with said bottom edge of said wall for non-slip cooperation with said supporting surface, or releasable fastening means including a first fastener portion integral with said tray bottom surface and a second fastener portion integral with said supporting surface.

2. The automobile trunk organizer as defined by claim 1 wherein said side wall of said tray tapers outwardly from said outer edge to said supporting surface, said top surface of said tray being generally rectangular and said bottom edge of said side wall being substantially continuous, and including handle means for lifting said tray from said supporting surface.

3. The automobile trunk organizer as defined by claim 2 wherein said handle means is defined by a pair of cut-outs in said side wall, said cut-outs in said side wall being on opposite sides of said tray.

4. The automobile trunk organizer as defined by claim 3 wherein said side wall is defined by parallel pairs of side wall portions, said cut-outs defining said handle means comprising centered interruptions in said bottom edge.

5. The automobile trunk organizer as defined by claim 4 wherein said position maintaining means includes a plurality of gripping nipples associated with said bottom edge of said side wall for non-slip cooperation with said supporting surface.

6. The automobile trunk organizer as defined by claim 4 wherein said position maintaining means includes releasable fastening means comprising a first fastener portion integral with said tray and a second fastener portion integral with said supporting surface.

7. The automobile trunk organizer as defined by claim 4 wherein said compartments include a plurality of cylindrical compartments and a plurality of rectangular compartments for receiving articles of different shapes for maintaining an automobile.

8. The automobile trunk organizer as defined by claim 7 wherein said cylindrical compartments are disposed on one side of said tray and said rectangular compartments are disposed on the other side of said tray.

9. The automobile trunk organizer as defined by claim 8 wherein said cylindrical compartments are sized and shaped to hold oil, transmission fluid and brake fluid containers and a funnel and said rectangular compartments are sized and shaped to hold coolant, windshield solvent and tools and rags.

10. The automobile trunk organizer as defined by claim 9 including another rectangular compartment sized and shaped to hold bulbs and fuses, said bulb and fuse rectangular compartment being disposed centrally of said tray, said bottom surface of said bulb and fuse rectangular compartment being spaced intermediate said supporting surface and said top surface of said tray.

* * * * *